US011526612B2

(12) United States Patent
Trim et al.

(10) Patent No.: US 11,526,612 B2
(45) Date of Patent: Dec. 13, 2022

(54) COMPUTER FILE METADATA SEGMENTATION SECURITY SYSTEM

(71) Applicant: International Business Machines Corporation, Armonk, NY (US)

(72) Inventors: Craig M. Trim, Ventura, CA (US); Shikhar Kwatra, San Jose, CA (US); Iranna Dharmaraya Ankad, Bengaluru (IN); Zachary A. Silverstein, Jacksonville, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/027,753

(22) Filed: Sep. 22, 2020

(65) Prior Publication Data
US 2022/0092184 A1 Mar. 24, 2022

(51) Int. Cl.
*G06F 21/56* (2013.01)

(52) U.S. Cl.
CPC .......... *G06F 21/568* (2013.01); *G06F 21/564* (2013.01); *G06F 21/565* (2013.01); *G06F 2221/034* (2013.01)

(58) Field of Classification Search
USPC ........................................................ 726/24
See application file for complete search history.

(56) References Cited

U.S. PATENT DOCUMENTS

| 7,584,190 B2 | 9/2009 | Lechner |
| 7,685,126 B2 | 3/2010 | Patel |
| 7,937,407 B2 | 5/2011 | Goto |
| 8,156,123 B2 | 4/2012 | Tribble |

(Continued)

FOREIGN PATENT DOCUMENTS

| CN | 100367794 C | 2/2008 |
| CN | 106330452 B | 1/2017 |

(Continued)

OTHER PUBLICATIONS

Mell et al., "The NIST Definition of Cloud Computing", Recommendations of the National Institute of Standards and Technology, NIST Special Publication 800-145, Sep. 2011, 7 pages.

(Continued)

*Primary Examiner* — Sakinah White Taylor
(74) *Attorney, Agent, or Firm* — Aaron N. Pontikos

(57) ABSTRACT

A collaborative security enhancement system for digital files is provided. A computing device detects a transfer of a digital file between a source device and a destination device in a given group of devices. The computing device generates a unique identifier (UID) for the transferred digital file. The computing device instructs that information relating to the digital file be stored in a record associated with the digital file, wherein the information includes: (i) an identification of the source device, (ii) an identification of the destination device; and (iii) the generated UID. The computing device identifies that the digital file has been contaminated. The computing device identifies a source of the contamination based, at least in part, on the stored information in response to identifying that the digital file has been contaminated.

20 Claims, 6 Drawing Sheets

(56) References Cited

U.S. PATENT DOCUMENTS

| | | | | |
|---|---|---|---|---|
| 8,533,850 | B2* | 9/2013 | Onodera | H04L 63/1416 709/224 |
| 8,881,282 | B1* | 11/2014 | Aziz | G06F 21/554 726/24 |
| 10,169,584 | B1* | 1/2019 | Roundy | G06F 21/566 |
| 10,341,281 | B2 | 7/2019 | Brandwine | |
| 2003/0154396 | A1* | 8/2003 | Godwin | G06F 21/552 726/23 |
| 2007/0028302 | A1 | 2/2007 | Brennan | |
| 2007/0028304 | A1 | 2/2007 | Brennan | |
| 2010/0005070 | A1 | 1/2010 | Moriya | |
| 2016/0364707 | A1* | 12/2016 | Varma | G06F 21/10 |
| 2017/0134162 | A1* | 5/2017 | Code | H04L 9/3236 |
| 2017/0163839 | A1 | 6/2017 | Arana | |
| 2017/0244637 | A1* | 8/2017 | Singhal | H04L 45/7453 |
| 2017/0244734 | A1* | 8/2017 | Kinder | H04L 63/20 |
| 2018/0198821 | A1* | 7/2018 | Gopalakrishna | H04L 63/1416 |
| 2018/0225461 | A1* | 8/2018 | Kotler | G06F 21/577 |
| 2019/0147168 | A1 | 5/2019 | Kim | |
| 2019/0158524 | A1 | 5/2019 | Zadeh | |
| 2020/0052986 | A1* | 2/2020 | Sridhar | H04L 41/5006 |
| 2021/0117544 | A1* | 4/2021 | Kurtz | G06F 21/566 |

FOREIGN PATENT DOCUMENTS

| | | | | |
|---|---|---|---|---|
| CN | 111611585 | A | 9/2020 | |
| EP | 2330518 | A3 | 6/2011 | |
| KR | 101484023 | B1 * | 1/2015 | G06F 21/56 |
| RU | 2491623 | C1 | 8/2013 | |
| WO | 2005046238 | A1 | 5/2005 | |
| WO | 2018032373 | A1 | 2/2018 | |

OTHER PUBLICATIONS

"Computer File Metadata Segmentation Security System", PCT Application No. CN2021/118527, filed on Sep. 15, 2021, 48 pages.
Patent Cooperation Treaty PCT, International Searching Authority, Notification of Transmittal of the International Search Report and the Written Opinion of The International Searching Authority, or the Declaration, dated Dec. 15, 2021, Applicant's or agent's file reference PF210680PCT, International application No. PCT/CN2021/118527, International filing date Sep. 15, 2021 (Sep. 15, 2021), 10 pages.

* cited by examiner

COMPUTER FILE METADATA SEGMENTATION SECURITY SYSTEM

BACKGROUND OF THE INVENTION

The present invention relates generally to the field of security systems, and more particularly to the monitoring of computer files by security systems.

The proliferation of the digital world allows has enriched the ability for users to exchange digital file contents over a network. Generally, these file contents can contain malicious software that hinder the functions of the computer system without identifying the source of the malicious software.

SUMMARY

Embodiments of the present invention provide a method, system, and computer program product.

A first embodiment encompasses a method for collaborative security enhancement for digital files. One or more processors detect a transfer of a digital file between a source device and a destination device in a given group of devices. One or more processors generate a unique identifier (UID) for the transferred digital file. One or more processors instruct that information relating to the digital file be stored in a record associated with the digital file, wherein the information includes: (i) an identification of the source device, (ii) an identification of the destination device; and (iii) the generated UID. One or more processors identify that the digital file has been contaminated. One or more processors identify a source of the contamination based, at least in part, on the stored information in response to identifying that the digital file has been contaminated.

A second embodiment encompasses a computer program product for collaborative security enhancement for digital files. The computer program product includes one or more computer readable storage media and program instructions stored on the one or more computer-readable storage media. The program instructions include program instructions to detect a transfer of a digital file between a source device and a destination device in a given group of devices. The program instructions include program instructions to generate a unique identifier (UID) for the transferred digital file. The program instructions include program instructions to instruct that information relating to the digital file be stored in a record associated with the digital file, wherein the information includes: (i) an identification of the source device, (ii) an identification of the destination device; and (iii) the generated UID. The program instructions include program instructions to identify that the digital file has been contaminated. The program instructions include program instructions to identify a source of the contamination based, at least in part, on the stored information in response to identifying that the digital file has been contaminated.

A third embodiment encompasses a computer system for collaborative security enhancement for digital files. The computer system includes one or more computer processors, one or more computer-readable storage media, and program instructions stored on the computer-readable storage media for execution by at least one of the one or more processors. The program instructions include program instructions to detect a transfer of a digital file between a source device and a destination device in a given group of devices. The program instructions include program instructions to generate a unique identifier (UID) for the transferred digital file. The program instructions include program instructions to instruct that information relating to the digital file be stored in a record associated with the digital file, wherein the information includes: (i) an identification of the source device, (ii) an identification of the destination device; and (iii) the generated UID. The program instructions include program instructions to identify that the digital file has been contaminated. The program instructions include program instructions to identify a source of the contamination based, at least in part, on the stored information in response to identifying that the digital file has been contaminated.

DETAILED DESCRIPTION

Figure 1:
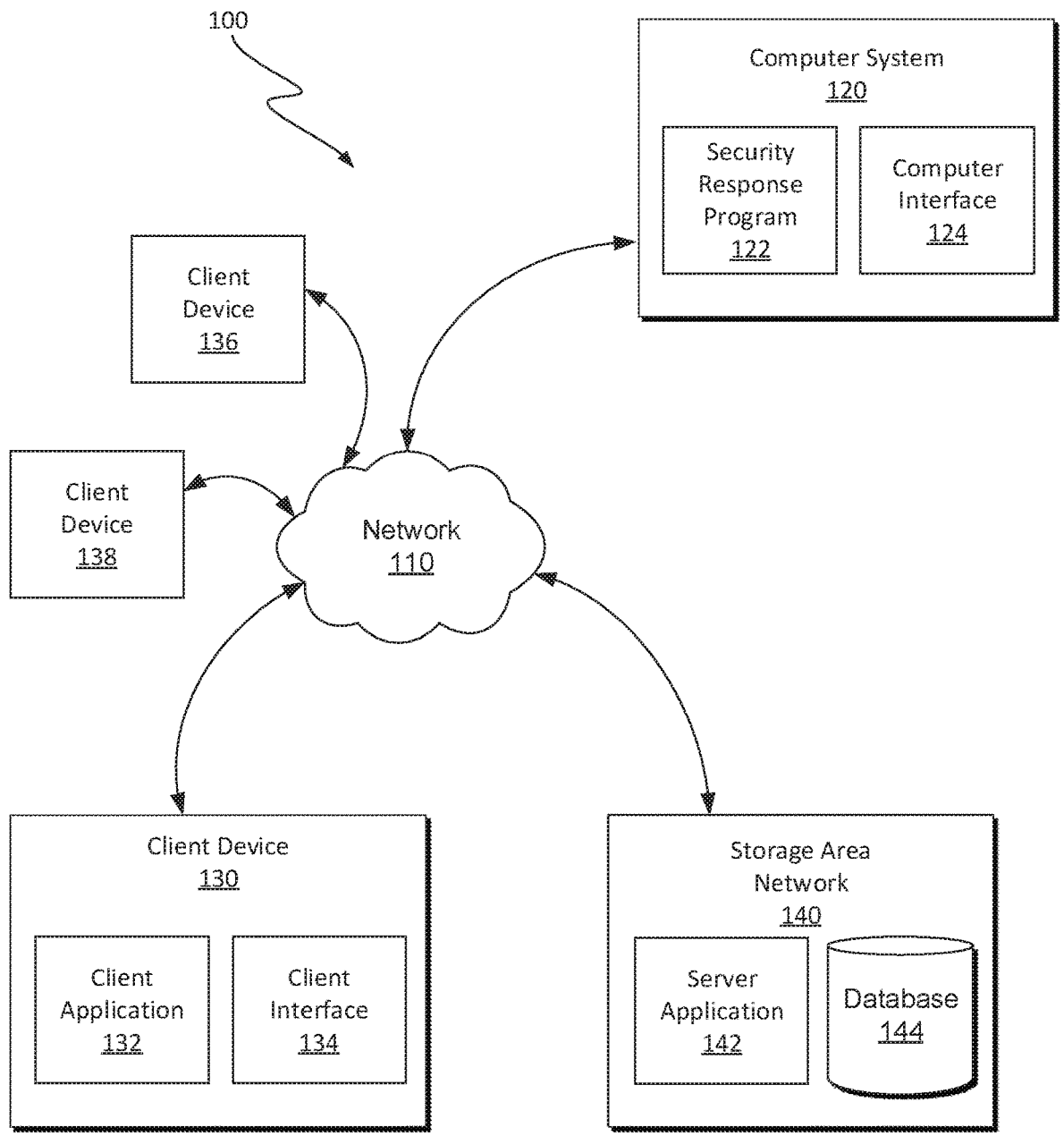
FIG. 1 is a functional block diagram illustrating a computing environment, in which a computing device identifies a contaminated digital file through metadata backtracking, in accordance with an exemplary embodiment of the present invention.

Detailed embodiments of the present invention are disclosed herein with reference to the accompanying drawings. It is to be understood that the disclosed embodiments are merely illustrative of potential embodiments of the present invention and may take various forms. In addition, each of the examples given in connection with the various embodiments is intended to be illustrative, and not restrictive. Further, the figures are not necessarily to scale, and some features may be exaggerated to show details of particular components. Therefore, specific structural and functional details disclosed herein are not to be interpreted as limiting, but merely as a representative basis for teaching one skilled in the art to variously employ the present invention.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the present invention recognize that in a modernized digital climate users are capable of exchanging large quantities of digital files between computer systems over a network, where the digital files can potentially contain contamination. Embodiments of the present invention further recognize that the digital files can be shared through social media platforms or Email-servers, etc. Additionally, embodiments of the present invention recognize the importance to scan and analyze the files for contamination and remove the contamination as necessary and inform users of the source of the contamination and which files may be corrupted.

Embodiments of the present invention recognize that users may not be aware that a file contains contamination, because antivirus software or virus signatures may not be properly updated, for example. Generally, the user may not become cognizant of the contamination until a digital file is shared from the user's computer system and another user's computer system becomes corrupted or an antivirus identifies the contamination. Embodiments of the present invention provide for a more efficient and effective system for backtracking and identification of the source of the contamination. Furthermore, embodiments of the present invention provide for analyzing the metadata of the digital file and proactively notifying the source to prevent further spread of the contamination and to communicate where the corrupted digital file has been shared with other users.

Embodiments of the present invention provide a technological improvement over known solutions for computer system security. Embodiments of the present invention provide servers and systems that improve over conventional systems by providing a more secure and efficient system, thereby decreasing downtime of servers and systems when contamination corrupts those servers and systems.

The present invention will now be described in detail with reference to the Figures.

FIG. 1 is a functional block diagram illustrating a computing environment, generally designated 100, in accordance with one embodiment of the present invention. Computing environment 100 incudes computer system 120, client device 130, client device 136, client device 138 and storage area network (SAN) 140 connected over network 110. Computer system 120 includes security response program 122 and computer interface 124. Client device 130 includes client application 132 and client interface 134. Storage area network (SAN) 140 includes server application 142 and database 144.

In various embodiment of the present invention, computer system 120 is a computing device that can be a standalone device, a server, a laptop computer, a tablet computer, a netbook computer, a personal computer (PC), a personal digital assistant (PDA), a desktop computer, or any programmable electronic device capable of receiving, sending, and processing data. In general, computer system 120 represents any programmable electronic device or combination of programmable electronic devices capable of executing machine readable program instructions and communications with various other computer systems (not shown). In another embodiment, computer system 120 represents a computing system utilizing clustered computers and components to act as a single pool of seamless resources. In general, computer system 120 can be any computing device or a combination of devices with access to various other computing systems (not shown) and is capable of executing security response program 122 and computer interface 124. Computer system 120 may include internal and external hardware components, as described in further detail with respect to FIG. 6.

In this exemplary embodiment, security response program 122 and computer interface 124 are stored on computer system 120. However, in other embodiments, security response program 122 and computer interface 124 are stored externally and accessed through a communication network, such as network 110. Network 110 can be, for example, a local area network (LAN), a wide area network (WAN) such as the Internet, or a combination of the two, and may include wired, wireless, fiber optic or any other connection known in the art. In general, network 110 can be any combination of connections and protocols that will support communications between computer system 120, client device 130, and SAN 140, and various other computer systems (not shown), in accordance with desired embodiment of the present invention.

In the embodiment depicted in FIG. 1, security response program 122, at least in part, has access to client application 132 and can communicate data stored on computer system 120 to client device 130, SAN 140, and various other computer systems (not shown). More specifically, security response program 122 defines a user of computer system 120 that has access to data stored on client device 130 and/or database 144.

Security response program 122 is depicted in FIG. 1 for illustrative simplicity. In various embodiments of the present invention, security response program 122 represents logical operations executing on computer system 120, where computer interface 124 manages the ability to view these logical operations that are managed and executed in accordance with security response program 122. In some embodiments, security response program 122 represents a cognitive AI system that processes and analyzes input and output (I/O). Additionally, security response program 122, when executing cognitive AI processing, operates to learn from the I/O that was analyzed and generates an antivirus action with a set of program instructions for the user to remove the contamination from the digital file stored on client device 130.

Computer system 120 includes computer interface 124. Computer interface 124 provides an interface between computer system 120, client device 130, and SAN 140. In some embodiments, computer interface 124 can be a graphical user interface (GUI) or a web user interface (WUI) and can display, text, documents, web browsers, windows, user options, application interfaces, and instructions for operation, and includes the information (such as graphic, text, and sound) that a program presents to a user and the control sequences the user employs to control the program. In some embodiments, computer system 120 accesses data communicated from client device 130 and/or SAN 140 via a client-based application that runs on computer system 120. For example, computer system 120 includes mobile application software that provides an interface between computer system 120, client device 130, and SAN 140. In various embodiments, computer system 120 communicates the GUI or WUI to client device 130 for instruction and use by a user of client device 130.

In various embodiments, client device 130 is a computing device that can be a standalone device, a server, a laptop computer, a tablet computer, a netbook computer, a personal computer (PC), a personal digital assistant (PDA), a desktop computer, or any programmable electronic device capable of receiving, sending and processing data. In general, computer system 120 represents any programmable electronic device or combination of programmable electronic devices capable of executing machine readable program instructions and communications with various other computer systems (not shown). In another embodiment, computer system 120 represents a computing system utilizing clustered computers and components to act as a single pool of seamless resources. In general, computer system 120 can be any computing device or a combination of devices with access to various other computing systems (not shown) and is capable of executing client application 132 and client interface 134. Client device 130 may include internal and external hardware components, as described in further detail with respect to FIG. 6.

Client application 132 is depicted in FIG. 1 for illustrative simplicity. In various embodiments of the present invention client application 132 represents logical operations executing on client device 130, where client interface 134 manages the ability to view these various embodiments, client application 132 defines a user of client device 130 that has access to data stored on computer system 120 and/or database 144.

Storage area network (SAN) 140 is a storage system that includes server application 142 and database 144. SAN 140 may include one or more, but is not limited to, computing devices, servers, server-clusters, web-servers, databases and storage devices. SAN 140 operates to communicate with computer system 120, client device 130, and various other computing devices (not shown) over a network, such as network 110. For example, SAN 140 communicates with security response program 122 to transfer data between computer system 120, client device 130, and various other computing devices (not shown) that are not connected to network 110. SAN 140 can be any computing device or a combination of devices that are communicatively connected to a local IoT network, i.e., a network comprised of various computing devices including, but are not limited to computer system 120 and client device 130, to provide the functionality described herein. SAN 140 can include internal and external hardware components as described with respect to FIG. 6. The present invention recognizes that FIG. 1 may include any number of computing devices, servers, databases, and/or storage devices, and the present invention is not limited to only what is depicted in FIG. 1. As such, in some embodiments some of the features of computer system 120 are included as part of SAN 140 and/or another computing device.

Additionally, in some embodiments, SAN 140 and computer system 120 represent, or are part of, a cloud computing platform. Cloud computing is a model or service delivery for enabling convenient, on demand network access to a shared pool of configurable computing resources (e.g., networks, network bandwidth, servers, processing, memory, storage, applications, virtual machines, and service(s) that can be rapidly provisioned and released with minimal management effort or interaction with a provider of a service. A cloud model may include characteristics such as on-demand self-service, broad network access, resource pooling, rapid elasticity, and measured service, can be represented by service models including a platform as a service (PaaS) model, an infrastructure as a service (IaaS) model, and a software as a service (SaaS) model, and can be implemented as various deployment models as a private cloud, a community cloud, a public cloud, and a hybrid cloud. In various embodiments, SAN 140 represents a database or website that includes, but is not limited to, data associated with weather patterns.

SAN 140 and computer system 120 are depicted in FIG. 1 for illustrative simplicity. However it is to be understood that, in various embodiments, SAN 140 and computer system 120 can include any number of databases that are managed in accordance with the functionality of security response program 122 and server application 142. In general, database 144 represents data and server application 142 represents code that provides an ability to use and modify the data. In an alternative embodiment, security response program 122 can also represent any combination of the aforementioned features, in which server application 142 has access to database 144. To illustrate various aspects of the present invention, examples of server application 142 are presented in which security response program 122 represents one or more of, but is not limited to, dynamic seat selection for a user.

In some embodiments, server application 142 and database 144 are stored on SAN 140. However, in various embodiments, server application 142 and database 144 may be stored externally and accessed through a communication network, such as network 110, as discussed above.

Security response program 122 is depicted in FIG. 1 for illustrative simplicity. Computer system 120, however, can include any number of logics and/or programs that are managed in accordance with security response program 122. In general, computer system 120 manages access to security response program 122, which represents a physical or virtual resource. In some embodiments, security response program 122 includes certain information and represents code that, when executed, enables computer system 120 to take specific action with respect to another physical resource and/or virtual resource based on, but not limited to, that certain information. In other words, in such embodiments, security response program 122 manages, at least, the ability of computer system 120 to take various actions with respect to one or more physical resources and/or virtual resources. In some embodiments, security response program 122 can also embody any combination of the aforementioned elements. To illustrate various aspects of the present invention, examples of security response program 122 are presented in which security response program 122 includes one or more of a user profile request, a temperature profile, and manual and IoT feedback, but embodiments of security response program 122 are not limited thereto. Embodiments of the present invention recognize that security response program 122 may include other forms of transactions that are known in the art.

In various embodiments of the present invention, a user of client device 130 transfers a digital file between various other users within computing environment 100 (e.g., client device 136 and client device 138), utilizing, at least, client application 132. In various embodiments, client application 132 detects that digital file and communicates the digital file to a user based on, at least, the destination selected by the user of client device 130. In various embodiments of the present invention, security response program 122 monitors the transfer of the digital file between the users.

Embodiments of the present invention provide for a collaborative security enhancement system for digital files, whereby the system backtracks to identify the contamination (e.g., broken files, malware, etc.) that corrupts and harms the users' systems and prohibits the source of the contamination from further spreading the corrupted digital files (e.g., digital files that are contaminated). In various embodiments, security response program 122 tracks the source and the destinations that the corrupted digital file was transferred to utilizing, at least, the checksum stored in the metadata of the digital files. In various embodiments, security response program 122 backtracks using the checksum stored in the metadata and informs the source of the corrupted digital file stored on the computer system and provides instructions on how to safely remove the contamination from the user's computer system, and prohibits the user from transferring the corrupted digital file to any other users. Additionally, security response program 122 prohibits users that have the corrupted digital file, that share a similar checksum to the source, from transferring the corrupted digital file to other users. In various embodiments, security response program 122 represents an artificial intelligence (AI) method for monitoring the metadata associated with the digital files for users in the collaborative environment, wherein the collaborative environment provides for user identification and transferring digital files between users. In various embodiments, actions performed by security response program 122 within the collaborative environment include, but are not limited to, (i) identifying file contents, (ii) scanning for contamination during and after the transfer of digital files between users, and (iii) authorizing security permissions for users when a user transfers a single digital file between a plurality of computer systems (e.g., a plurality of users). In various embodiments, security response program 122 further represents logical operations, where security response program 122 provides a unique identifier (UID) checksum for each digital file transferred between users.

In various embodiments, a user of client device 130 utilizes client application 132 to share a digital file with other users using a cloud-based server. In various embodiments, computer system 120 and SAN 140 are cloud-based servers and security response program 122 executing on computer system 120 includes AI. In various embodiments, security system 120 analyzes the digital files communicated between users for contamination. In various embodiments, security response program 122 labels a digital file with a checksum value based on, at least, the metadata of the digital file. Security response program 122 stores the checksum on database 144 for security and backtracking if contamination is later detected on the digital file.

Embodiments of the present invention provide if a digital file that was transferred previously between, at least, two users and is prepared for or transferred between one or more additional users, the checksum is re-validated for the individual digital file. In various embodiments, security response program 122 re-validates the checksum for the individual digital file when the individual digital file is transferred between one or more additional users. In various embodiments, when a second user receives the individual digital file, security response program 122 re-validates the checksum for a second transfer of the individual digital file by generating a second checksum associated with the digital file and stores the second checksum in the metadata and a copy of the checksum on database 144. In various embodiments, security response program 122 identifies whether the checksums for the various transfers between users match. In various embodiments, if security response program 122 identifies that, at least, one checksum does not match the original checksum, then security response program 122 stores this data on database 144 for subsequent identification of contamination associated with the individual digital file. Embodiments of the present invention recognize that a mismatched checksum is utilized by security response program 122 to backtrack through the metadata and identify the source of the contamination. In an alternative embodiment, a mismatched checksum indicates that a user may have modified the digital file and security response program 122 stores the data of the mismatched checksum in the metadata and on database 144.

In various embodiments, security response program 122 represents an antivirus software or malicious execution detector and monitors for contamination stored on client device 130 or other various computing devices within collaborative system. Embodiments of the present invention recognize that client device 130 and various other computing devices (e.g., client device 136, client device 138) within the collaborative environment have antivirus software downloaded and executing on the computer systems. If security response program 122 detects contamination located on a digital file, then security response program 122 flags the checksum as potential contamination and disseminates the data of the potential contamination to various antivirus programs contained within the collaborative environment. Embodiments of the present invention recognize that any computing device that receives or downloads the flagged checksum will be provided a antivirus action with program instructions from security response program 122, instructing the user of computing device 130 to disable the file.

In various embodiments, a first user uploads a digital file to the cloud-based server and security response program 122 analyzes the digital file and generates a checksum for the digital file and stores the checksum in the metadata for the file and on database 144. Embodiments of the present invention provide for user-based behavior detection, wherein security response program 122 represents an AI and monitors user behavior with regards to digital files transferred and downloaded within the cloud-based server. In various embodiments, at least, a second user downloads the digital file from the cloud-based server (e.g., database 144) and security response program 122 generates a checksum associated with the download of the digital file by the second user and stores the checksum in the metadata and on database 144. In various embodiments, security response program 122 analyzes the digital file to determine whether the digital file is corrupted by contamination. In various embodiments, security response program 122 monitors the activity of the second user and learns the user behavior of the digital files the second user downloads and/or the digital files the second user transfers to various other users within the collaborative environment. In various embodiments, if the second user wishes to transfer the same digital file that the second user download to one or more other users, security response program 122 will generate another checksum associated with the transfer and allow the various other users (e.g., client device 136, client device 138) to proceed with the digital file download without requiring authorization from security response program 122.

In various embodiments, security response program 122 utilizes backtracking to prohibit a user from transferring or downloading digital files which may corrupt or transmit various other users' computer systems (e.g., client device 136, client device 138). In various embodiments, security response program 122 identifies the source of the contamination by backtracking through the metadata. Security response program 122 identifies the existence of the contamination and provides an antivirus action with program instructions to remove the contamination from the user's computing device. Additionally, in various embodiments, security response program 122 utilizes backtracking to identify various computing devices in which the contamination resides and communicates an antivirus action with program instructions to remove the contamination. Lastly, security response program 122 prohibits the user from transferring or uploading the corrupted digital file to the users within the cloud-based server to prevent spread of the contamination.

Figure 2:
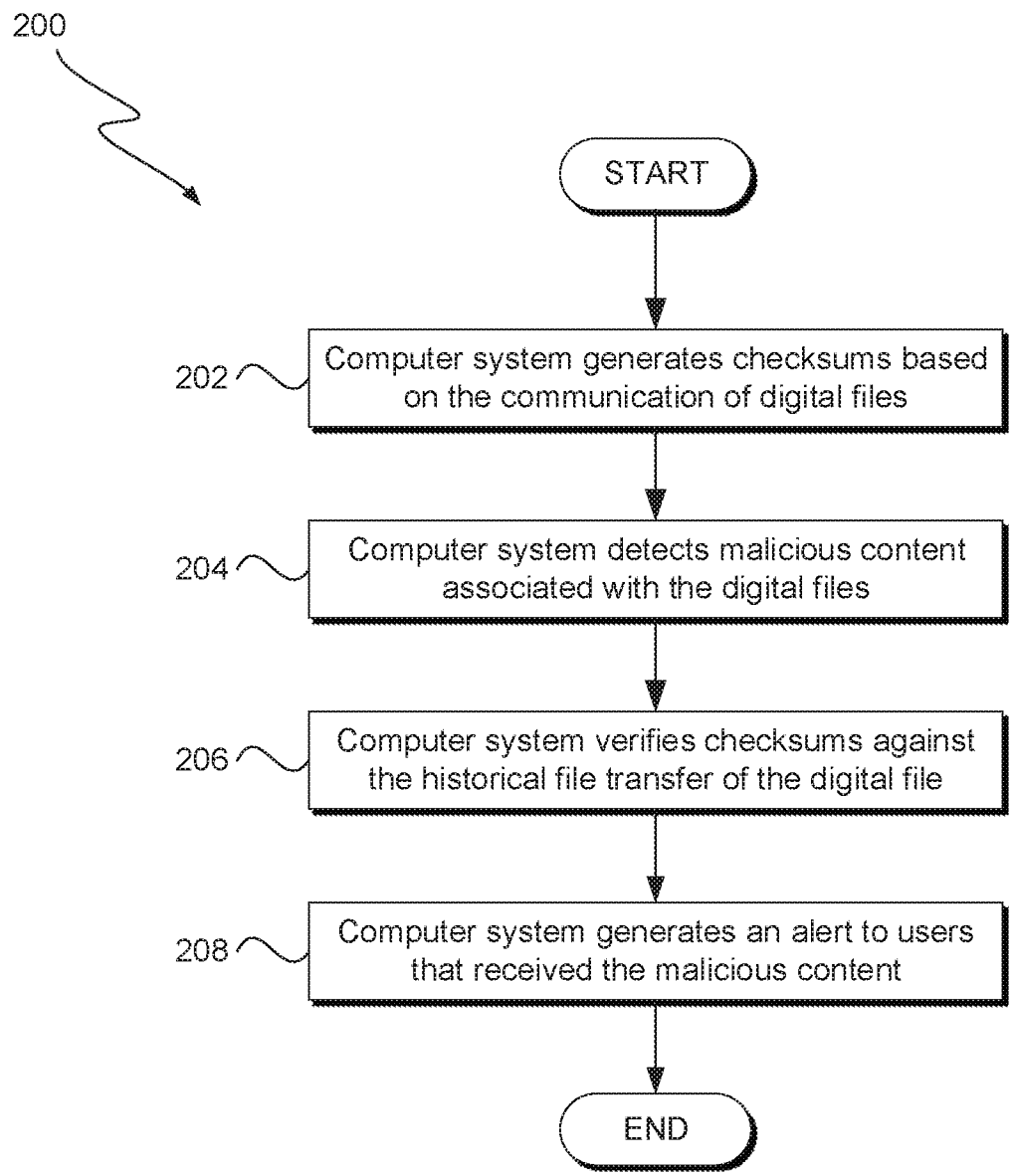
FIG. 2 illustrates operational processes of executing a system for generating an anti-virus action, on a computing device within the environment of FIG. 1, in accordance with an exemplary embodiment of the present invention.

FIG. 2 is a flowchart, 200, depicting operations of security response program 122 in computing environment 100, in accordance with an illustrative embodiment of the present invention. FIG. 2 also represents certain interactions between security response program 122 and client application 132. In some embodiments, the operations depicted in FIG. 2 incorporate the output of security response program 122 executing on computer system 120. It should be appreciated that FIG. 2 provides an illustration of the one implementation and does not imply any limitations with regard to the environments in which different embodiments may be implemented. Many modifications to depicted environment may be made. In one embodiment, the series of operations in FIG. 2 can be performed in any order. In another embodiment, the series of operations, depicted in FIG. 2, can be performed simultaneously. Additionally, the series of operations, depicted in FIG. 2, can be terminated at any operation. In addition to the features previously mentioned, any operations, depicted in FIG. 2, can be resumed at any time.

In operation 202, security response program 122 generates checksums based on the communication of the digital files between users. In various embodiments, security response program 122 monitors for communication of digital files between users. In various embodiments, users within the cloud-based server communicate digital files between one another. Additionally, users that receive digital files can transfer the digital files to one or more users within the cloud-based server. In various embodiments, security response program 122 identifies when users within the cloud-based server transfer digital files between various other users. In response to identifying when users transfer digital files between various other users within the cloud-based server, security response program 122 generates a checksum for each individual transfer of the digital files. In various embodiments, security response program 122 stores the checksum in the metadata of the digital file and on database 144. Embodiments of the present invention provide that the checksum allows for security response program 122 to backtrack through the metadata to identify the source of contamination associated with the digital files, wherein the checksum value changes based on, at least, if the digital file is modified. In various embodiments, the modification of the digital file includes, but is not limited to, contamination being attached to the digital file, contamination overwriting portions of the file code, or if a user modifies the digital file (e.g., a user modifies a word document by adding or removing characters within the word document).

Embodiments of the present invention further provide that the checksum value remains identical to the previous checksum value until the digital file is modified. In one example and embodiment, if a first user transfers the digital file to a second user, then security response program 122 generates a checksum value (ab) and stores this checksum value in the metadata of the digital file and on database 144. Additionally, if the second user does not modify the digital file and transfers the digital file to a third user, then security response program 122 generates, at least, a second checksum value (ab) that is identical to the previous checksum value generated when the second user received the digital file. Embodiments of the present invention provide that security response program 122 is capable of differentiating between innocuous changes from malicious changes, wherein security response program 122 analyzes the signature of the modified digital file. In various embodiments, if the signature of the modified digital file was modified by the recipient user, then security response program 122 accepts the modification by the recipient user as an innocuous change to the digital file. Alternatively, in various embodiments, security response program 122 analyzes the signature of the modified digital file and determines that the modified digital file was modified by another user, an unknown user, or an unknown program other than the recipient user, and in response security response program 122 determines that a malicious change to the digital file has occurred (e.g., a virus or trojan). In an alternative embodiment, if the second user modifies the digital file and/or the digital file becomes corrupted and transfers the digital file to a third user, then security response program 122 generates a second checksum (ac) that is different from the previous checksum value of the digital file received by the second user. In the alternative embodiment, security response program 122 stores the second checksum value (ac) in the metadata of the digital file and on database 144. In various embodiments, security response program 122 utilizes the checksum values to identify the source of any identified contamination associated with the digital file.

In operation 204, security response program 122 detects contamination associated with the digital files. In various embodiments, a digital file communicated by a user within the cloud-based server is identified to contain contamination. In various embodiments, security response program 122 labels the digital file that contains the contamination as corrupted digital file and stores this data on database 144, as discussed above.

In operation 206, security response program 122 verifies the checksums against the historical file transfer of the digital file. In response to security response program 122 identifying contamination associated with the digital file, security response program 122 begins backtracking through the historical file transfer and verifies the checksum values against one another to identify the source of the contamination. In various embodiments, security response program 122 identifies the most recent checksum value of the digital file, wherein the contamination was identified, and security response program 122 backtracks through the metadata to identify where the checksum value changes between transfers of users. In various embodiments, security response program 122 identifies when the checksum value changes between transfers of a user and security response program 122 determines that the user when the checksum value changed is the source of the contamination.

In one example embodiment, security response program 122 identifies contamination as described above with digital file A. Security response program 122 further identifies the most recent checksum value (i.e., checksum value (ac)) associated with the corrupted digital file. In this example embodiment, security response program 122 communicates with database 144 and retrieves the historical file transfer of digital file A. In this example embodiment, security response program 122 analyzes the historical file transfer and identifies the various checksum values associated with the transfer of digital file A between various users. Security response program 122 identifies that the corrupted digital file associated with checksum value (ac) was transferred to users: user F, user G, user H, and user J. Additionally, security response program 122 identifies through backtracking in the metadata of the digital file that the checksum value changed after user D received the digital file from user Q, wherein security response program 122 identifies that user Q was the original user to transfer the file and that when user D received the digital file from user Q the stored checksum value was checksum value (ab). Security response program 122 determines that the source of the corrupted digital file originated with user D.

Embodiments of the present invention provide that a given digital file transferred between users is given a specific checksum value stored as metadata and on the cloud-based database. Additionally, when the given digital file is transferred to another user of, at least, a third destination device (e.g. client device 130, client device 136, client device 138, etc.) the checksum value is re-calculated and appended into the metadata and the cloud-based database, wherein security response program 122 will compare the checksum values between the one or more transfers of the digital file.

Embodiments of the present invention provide that security response program 122 utilizes two methods of detection to detect malicious changes to digital files. In various embodiments, malicious changes are detected by antivirus software that is capable of scanning incoming files that are delivered to a destination device (e.g., client device 130, client device, 136, client device 138, etc.). In various other embodiments (or the same embodiments), malicious changes are detected by security response program 122 analyzing the signature (e.g., metadata) of the modified file and determining whether the modified digital file was modified by an unknown user, a non-recipient user, or an unknown program. In these embodiments, security response program 122 then identifies the contamination for the modified digital file based on, at least, the checksum value, and security response program 122 flags the file and all other related digital files with a matching checksum value.

In operation 208, security response program 122 generates an alert to users that received the contamination. In various embodiments, security response program 122 generates an antivirus action with program instructions to users affected by the contamination, in response to identifying the source of the corrupted digital file. In various embodiments, the antivirus action includes program instructions to instruct the user to remove the contamination from the digital file or to remove the corrupted digital file in total from the user's computing device (e.g., client device 130). In various embodiments, security response program 122 communicates the antivirus action with program instructions to each user identified by security response program 122 to have received the corrupted digital file. Additionally, in various embodiments, security response program 122 prohibits the users affected by the corrupted digital file from further transferring the corrupted digital file until the contamination is removed from the computing devices (e.g., client device 130).

Figure 3:
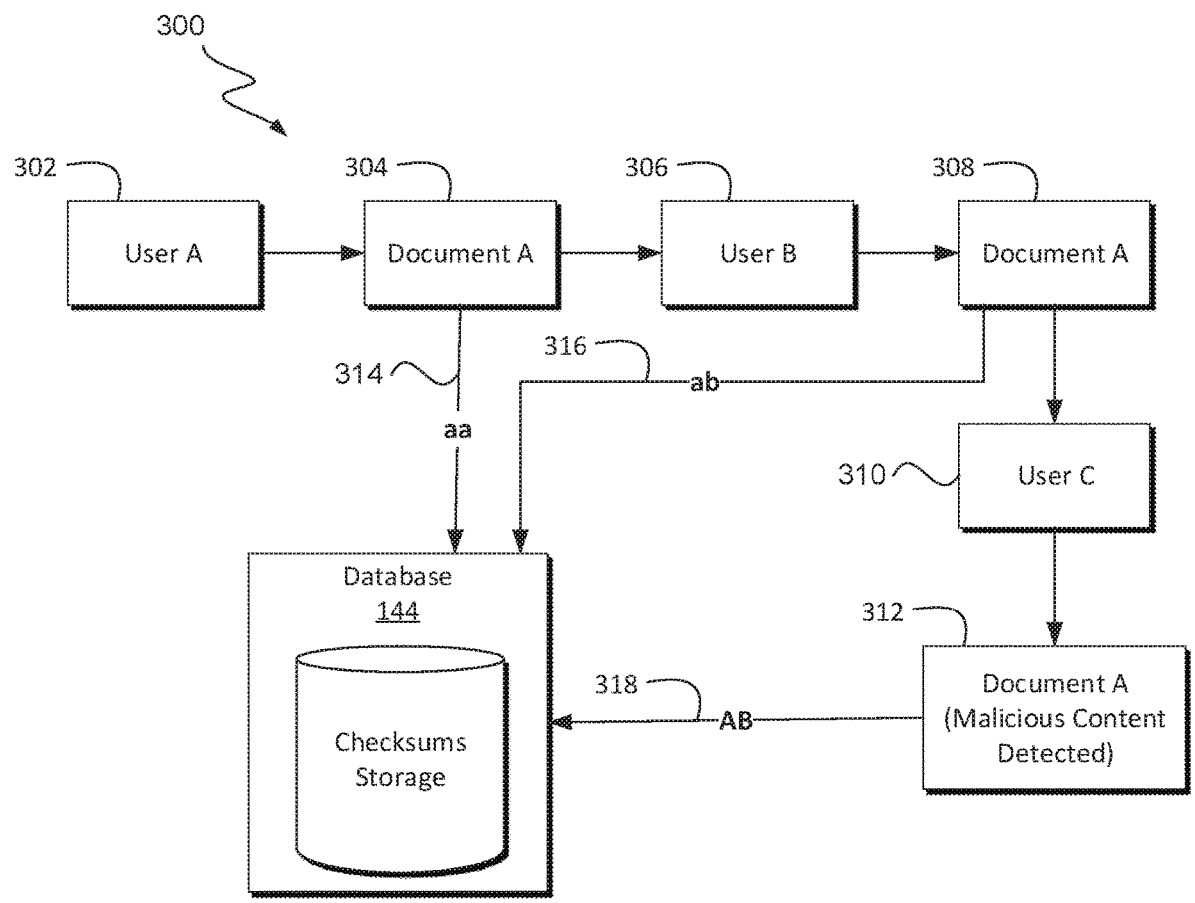
FIG. 3 depicts a block diagram illustrating a transfer of one or more documents between users within the environment of FIG. 1, in accordance with an exemplary embodiment of the present invention.

FIG. 3 depicts a block diagram, 300, of a transaction history between users of a document, wherein users transfer a document between one another, in accordance with an illustrative embodiment of the present invention. Embodiments of the present invention recognize that the document may be a digital file that is stored in the memory of the users' computing devices, respectively. FIG. 3 illustrates document A being transferred between user A 302, user B 306, and user C 310. In various embodiments, user A 302 transfers document A to user B 306 (304). In various embodiments, a checksum 314 is generated for document A 304 (i.e., aa) and checksum 314 is stored on the checksums storage (e.g., database 144) for subsequent review. In various embodiments, user B 306 transfers document A to user C 310 (308). In various embodiments, checksum 316 is generated for document A 308 (i.e., ab). In various embodiments, checksum 316 generated for document A 308 (i.e., ab) is stored on checksums storage. Embodiments of the present invention recognize that because the checksum changed from "aa" to "ab" between document A 304 and document A 308 that a modification to the digital file (e.g., document A) was made by user B 306 before being transferred to user C 310. One having ordinary skill in the art would understand that FIG. 3 is depicted for illustrative simplicity and that embodiments of the present invention are not limited to what is depicted. Embodiments of the present invention recognize that many transfers between users are possible and that one or more users can modify the document before contamination is attached to the document.

In various embodiments, security response program 122 identifies contamination associated with document A 312 stored on the computing device of user C 310, wherein document A 312 is flagged as corrupted and a checksum 318 is generated (i.e., AB) and is stored on checksums storage. In various embodiments, security response program 122 backtracks through the metadata of document A and identifies, at least, when the checksum value changed between transfers of users within FIG. 3. Embodiments of the present invention recognize that the checksum value changes when (i) a user modifies the digital document (e.g., Document A) and (ii) when contamination is attached to the Document A. In various embodiments, security response program 122 identifies that the checksum 316 value changed when User B 306 transferred Document A 308 to User C 310. In various embodiments, security response program 122 analyzes the checksum 314 value between User A 302 and User B 306 and confirms that User A 302 is not the source of the contamination. Security response program 122 runs a malicious diagnostic analysis on the computing device of User B 306 and identifies the contamination on the computing device of User B 306. In various embodiments, security response program 122 determines that the computing device of User B 306 is the source of the contamination based on, at least, the fact that the computing device of User B 306 is the earliest source of a change to Document A.

In an alternative embodiment, security response program 122 backtracks through the metadata to identify the source of the contamination. Embodiments of the present invention recognize that security response program 122 analyzes the metadata of Document A to identify the source of the contamination. In this alternative embodiment, security response program 122 identifies that the checksum 316 value changed between User B 306 and User C 310 and further identifies that the contamination resides on the computing device of User B306. Security response program 122 determines that the computing device of User B 306 is the potential source of the contamination; to confirm, security response program 122 analyzes the computing device of User A 302 and checksum 314 value. Security response program 122 analyzes the metadata and identifies that User A 302 is the initial transferer of Document A 304 and the initial checksum 314 value. In this alternative embodiment, security response program 122 identifies that the contamination resides on the computing device of User A 302. Security response program 122 determines that the computing device of User A 302 is the source of the contamination and security response program 122 further determines that the checksum 316 value changed between User B 306 and User C 310 because User B 306 modified Document A.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned model may include at least five characteristics, at least three service models, and at least four deployment models.

Characteristics are as follows:

On-demand self-service: a cloud consumer can unilaterally provision computing capabilities, such as server-time and network storage, as needed automatically without requiring human interaction with the service's provider.

Broad network access: capabilities are available over a network and accessed through standard mechanisms that promote use by heterogeneous thin or thick client platforms 9 e.g., mobile phones, laptops and PDAs).

Resource pooling: the provider's computing resources are pooled to serve multiple consumer using a multi-tenant model, with different physical and virtual resources dynamically assigned and reassigned according to demand. There is a sense of location independence in that the consumer generally has not control or knowledge over the exact locations of the provided resources but may be able to specify location at a higher level of abstraction (e.g., country, state, or datacenter).

Rapid elasticity: capabilities can be rapidly and elasticity provisioned, in some cases automatically, to quickly scale out and rapidly released to quickly scale in. To the consumer, the capabilities available for provisioning often appear to be unlimited and can be purchased in any quality at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual applications capabilities, with the possible exception of limited user-specific application configuration settings.

Platform as a Service (PaaS): the capability provided to the consumers to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environmental configurations.

Infrastructure as a Service (IaaS): the capability provided to the consumer to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or large industry group and is owned by an organization selling cloud services.

Hybrid cloud: the cloud infrastructure is a composition of two or more cloud (private, community or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
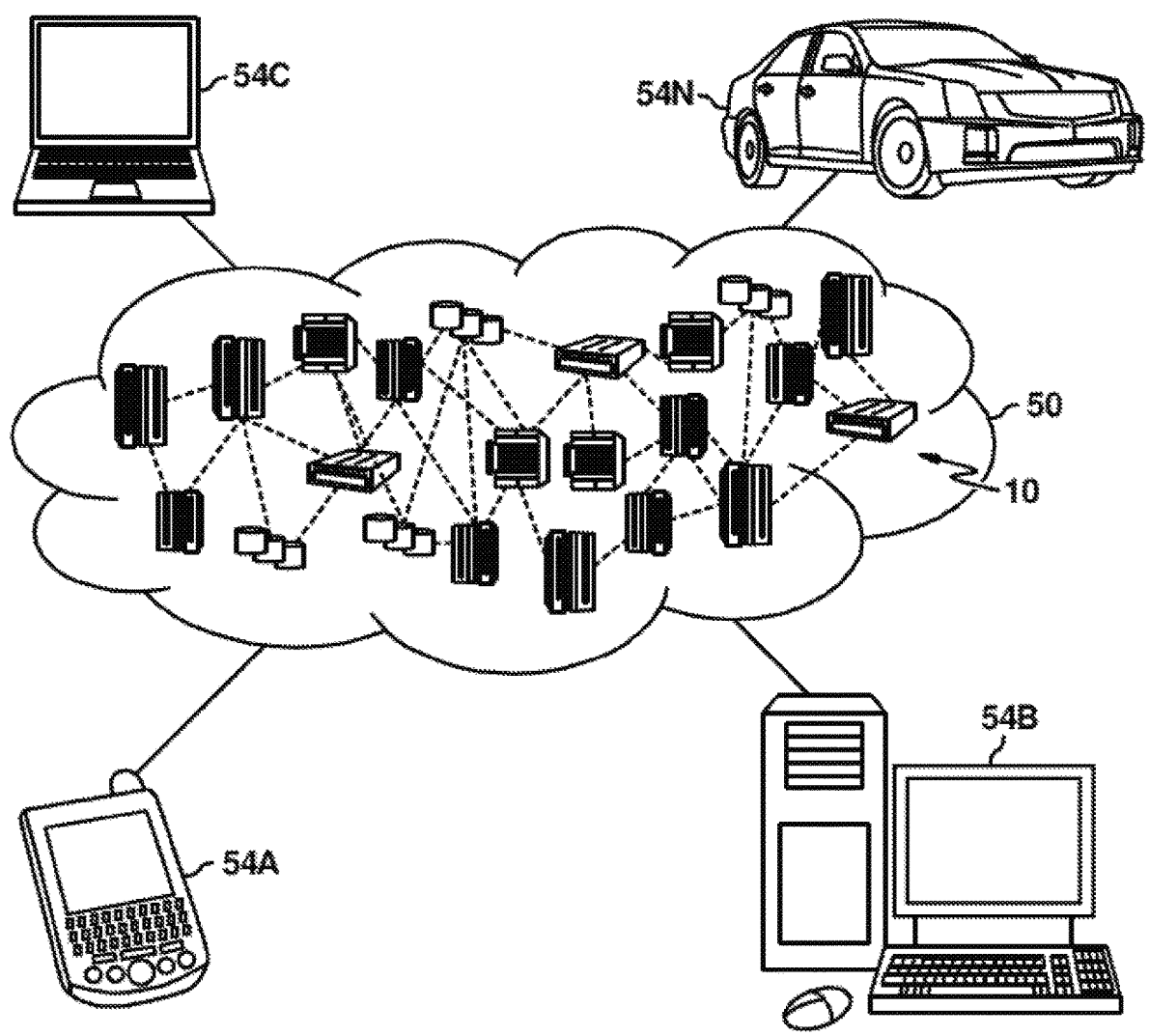
FIG. 4 depicts a cloud computing environment according to at least one embodiment of the present invention.

Referring now to FIG. 4, illustrative cloud computing environment 50 is depicted. As shown, cloud computing environment 50 includes one or more cloud computing nodes 10 with which local computing devices used by cloud consumer: such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
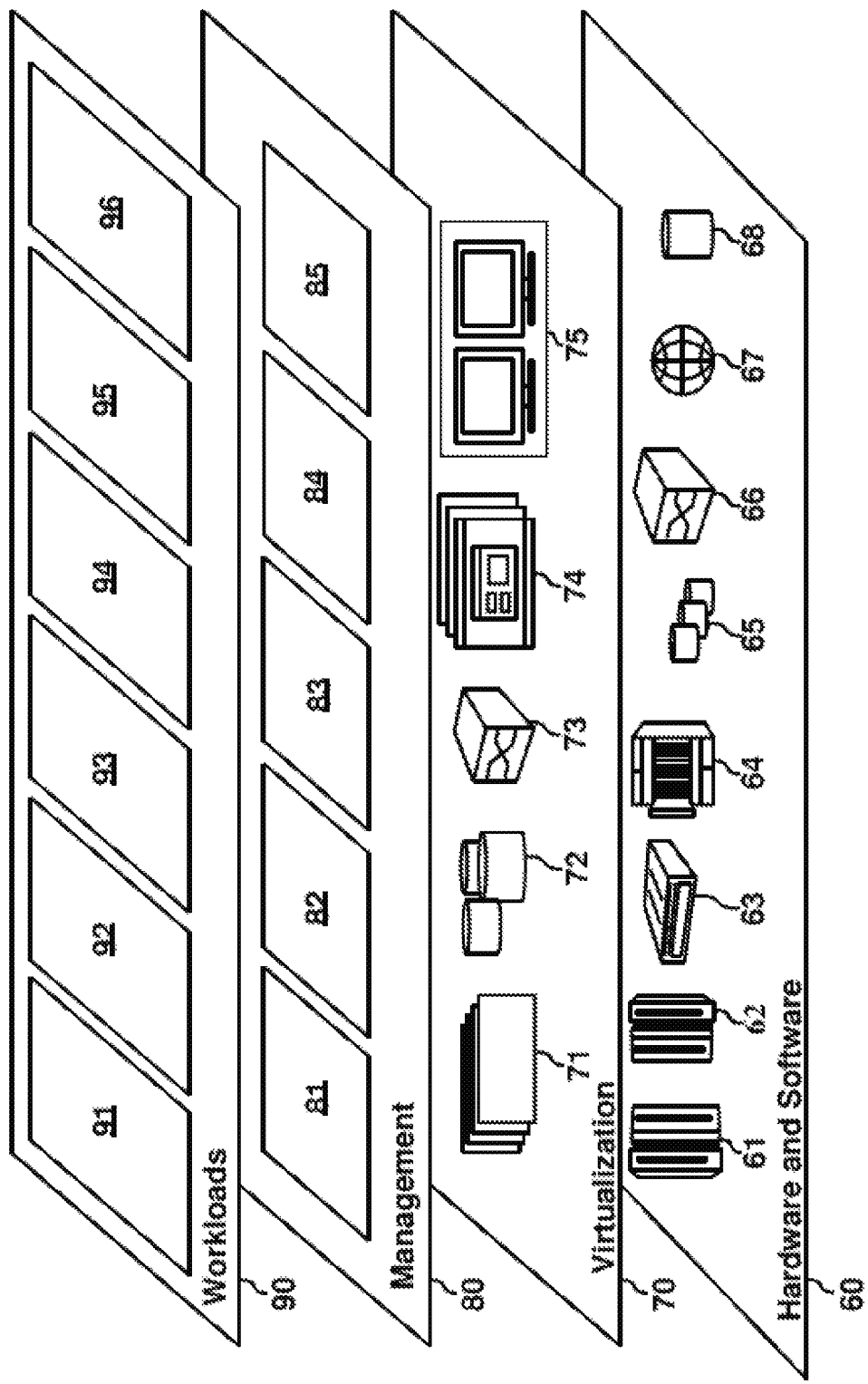
FIG. 5 depicts abstraction model layers according to at least on embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instructions Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73; including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include applications software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and providing soothing output 96.

Figure 6:
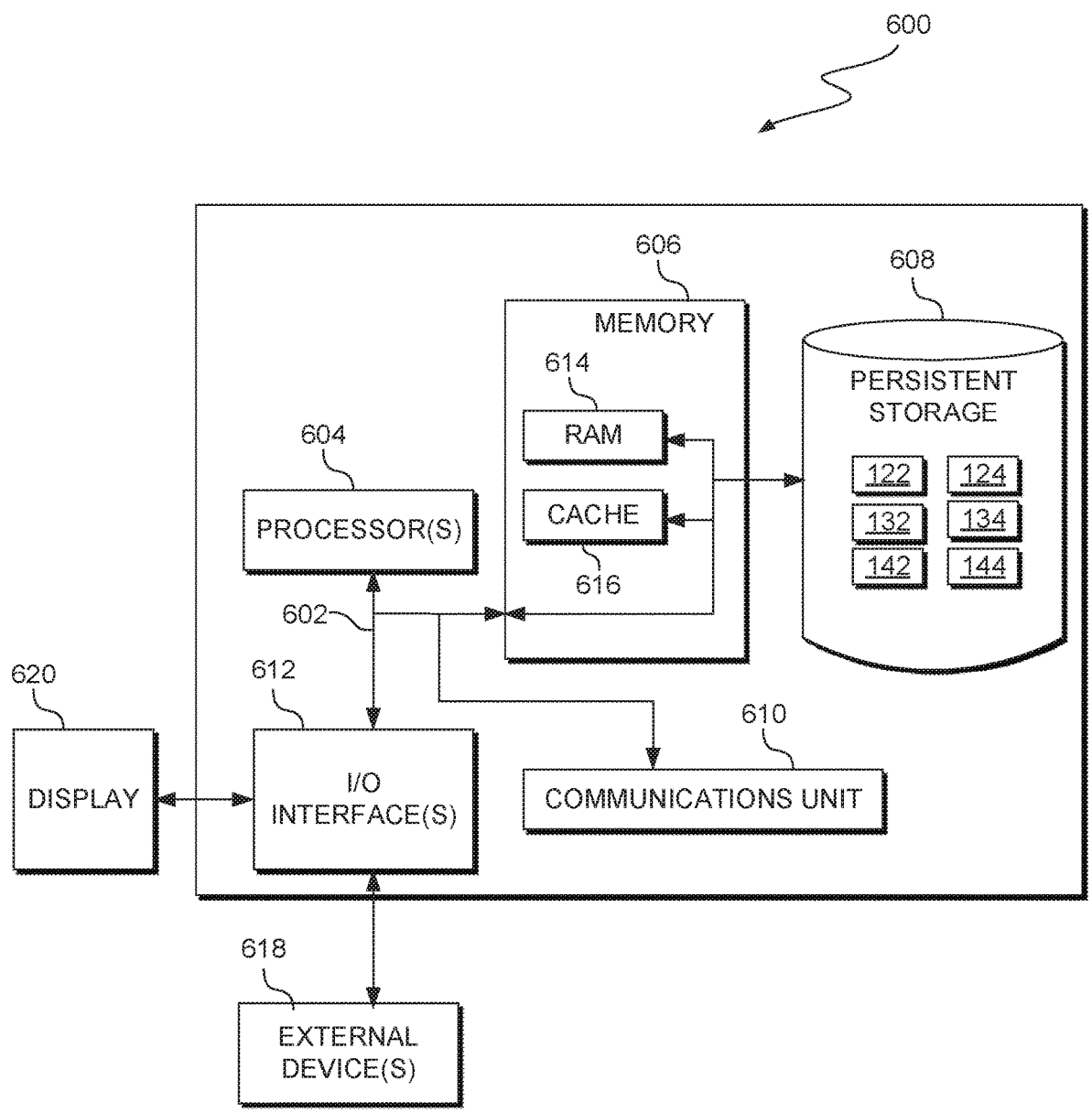
FIG. 6 depicts a block diagram of components of one or more computing devices within the computing environment depicted in FIG. 1, in accordance with an exemplary embodiment of the present invention.

FIG. 6 depicts a block diagram, 600, of components of computer system 120, client device 130, and SAN 140, in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made.

Computer system 120, client device 130, and SAN 140 includes communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer-readable storage media. In this embodiment, memory 606 includes random access memory (RAM) 614 and cache memory 616. In general, memory 606 can include any suitable volatile or non-volatile computer-readable storage media.

Security response program 122, computer interface 124, client application 132, client interface 134, server application 142, and database 144 are stored in persistent storage 608 for execution and/or access by one or more of the respective computer processors 604 via one or more memories of memory 606. In this embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer-readable storage medium that is also part of persistent storage X08.

Communications unit 610, in these examples, provides for communications with other data processing systems or devices, including resources of network 110. In these examples, communications unit 610 includes one or more network interface cards. Communications unit 610 may provide communications through the use of either or both physical and wireless communications links. Security response program 122, computer interface 124, client application 132, client interface 134, server application 142, and database 144 may be downloaded to persistent storage 608 through communications unit 610.

I/O interface(s) 612 allows for input and output of data with other devices that may be connected to computer system 120, client device 130, and SAN 140. For example, I/O interface 612 may provide a connection to external devices 618 such as a keyboard, keypad, a touch screen, and/or some other suitable input device. External devices 618 can also include portable computer-readable storage media such as, for example, thumb drives, portable optical or magnetic disks, and memory cards. Software and data used to practice embodiments of the present invention, e.g., Security response program 122, computer interface 124, client application 132, client interface 134, server application 142, and database 144, can be stored on such portable computer-readable storage media and can be loaded onto persistent storage 608 via I/O interface(s) 612. I/O interface(s) 612 also connect to a display 620.

Display 620 provides a mechanism to display data to a user and may be, for example, a computer monitor, or a television screen.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) such as, for example, "Smalltalk" and the like may be subject to trademark rights in various jurisdictions throughout the world and are used here only in reference to the products or services properly denominated by the marks to the extent that such trademark rights may exist.

What is claimed is:

1. A computer-implemented method, the method comprising:
    identifying, by one or more processors, transfers of a digital file between respective source devices and destination devices in a given group of devices;
    generating, by one or more processors, for each identified transfer, a unique identifier (UID) of the digital file;
    instructing, by one or more processors, that information relating to each identified transfer be stored in a record associated with the digital file, wherein the information includes: (i) an identification of the source device of the transfer, (ii) an identification of the destination device of the transfer; and (iii) the generated UID of the digital file for the transfer;
    identifying, by one or more processors, that the digital file has been contaminated;
    identifying, by one or more processors, a contaminated UID corresponding to the digital file responsive to identifying that said digital file has been contaminated;
    identifying, by one or more processors, one or more potentially contaminated devices in the given group of devices for which the generated UID matches the contaminated UID based, at least in part, on the information relating to each identified transfer; and
    notifying, by one or more processors, the one or more potentially contaminated devices that the digital file has been contaminated.

2. The computer-implemented method of claim 1, the method further comprising:
    instructing, by the one or more processors, the given group of devices to perform an antivirus action, wherein the antivirus action removes the contaminated digital file.

3. The computer-implemented method of claim 1, the method further comprising:
    notifying, by one or more processors, the given group of devices that the digital file has been contaminated; and instructing, by one or more processors, the given group of devices to prohibit further transferring of the contaminated digital file within the given group of devices.

4. The computer-implemented method of claim 1, wherein the contamination is identified through antivirus software.

5. The computer-implemented method of claim 1, wherein the contamination is identified by analyzing the information stored in the record associated with the digital file.

6. The computer-implemented method of claim 1, wherein the record associated with the digital file is stored in the digital file by the respective destination device for a transfer of the identified transfers.

7. The computer-implemented method of claim 1, wherein the record associated with the digital file is stored on a server, where the server is communicatively connected to the given group of devices.

8. The computer-implemented method of claim 1, the method further comprising:
retrieving, by one or more processors, from the stored record: (i) a first UID for a transfer of the digital file to a second source device, and (ii) a second UID for a transfer of the digital file from the second source device; and
determining, by one or more processors, that the second source device is a potential source of the contamination based, at least in part, on the second UID being different from the first UID.

9. A computer program product comprising:
one or more computer-readable storage media and program instructions stored on the one or more computer-readable storage media, the stored program instructions comprising:
program instructions to identify transfers of a digital file between respective source devices and destination devices in a given group of devices;
program instructions to generate, for each identified transfer, a unique identifier (UID) of the digital file;
program instructions to instruct that information relating to each identified transfer be stored in a record associated with the digital file, wherein the information includes: (i) an identification of the source device of the transfer, (ii) an identification of the destination device of the transfer; and (iii) the generated UID of the digital file for the transfer;
program instructions to identify that the digital file has been contaminated;
program instructions to identify a contaminated UID corresponding to the digital file responsive to identifying that said digital file has been contaminated;
program instructions to identify one or more potentially contaminated devices in the given group of devices for which the generated UID matches the contaminated UID based, at least in part, on the information relating to each identified transfer; and
program instructions to notify the one or more potentially contaminated devices that the digital file has been contaminated.

10. The computer program product of claim 9, the stored program instructions further comprising:
program instructions to instruct the given group of devices to perform an antivirus action, wherein the antivirus action removes the contaminated digital file.

11. The computer program product of claim 9, the stored program instructions further comprising:
program instructions to notify the given group of devices that the digital file has been contaminated; and
program instructions to instruct the given group of devices to prohibit further transferring of the contaminated digital file within the given group of devices.

12. The computer program product of claim 9, wherein the contamination is identified through antivirus software.

13. The computer program product of claim 9, wherein the contamination is identified by analyzing the information stored in the record associated with the digital file.

14. The computer program product of claim 9, wherein the record associated with the digital file is stored in the digital file by the respective destination device for a transfer of the identified transfers.

15. The computer program product of claim 9, wherein the record associated with the digital file is stored on a server, where the server is communicatively connected to the given group of devices.

16. The computer program product of claim 9, the stored program instructions further comprising:
program instructions to retrieve, from the stored record:
(i) a first UID for a transfer of the digital file to a second source device, and (ii) a second UID for a transfer of the digital file from the second source device; and
program instructions to determine that the second source device is a potential source of the contamination based, at least in part, on the second UID being different from the first UID.

17. A computer system, the computer system comprising:
one or more computer processors;
one or more computer readable storage medium; and
program instructions stored on the computer readable storage medium for execution by at least one of the one or more processors, the stored program instructions comprising:
program instructions to identify transfers of a digital file between respective source devices and destination devices in a given group of devices;
program instructions to generate, for each identified transfer, a unique identifier (UID) of the digital file;
program instructions to instruct that information relating to each identified transfer be stored in a record associated with the digital file, wherein the information includes: (i) an identification of the source device of the transfer, (ii) an identification of the destination device of the transfer; and (iii) the generated UID of the digital file for the transfer;
program instructions to identify that the digital file has been contaminated;
program instructions to identify a contaminated UID corresponding to the digital file responsive to identifying that said digital file has been contaminated;
program instructions to identify one or more potentially contaminated devices in the given group of devices for which the generated UID matches the contaminated UID based, at least in part, on the information relating to each identified transfer; and
program instructions to notify the one or more potentially contaminated devices that the digital file has been contaminated.

18. The computer system of claim 17, the stored program instructions further comprising:
program instructions to instruct the given group of devices to perform an antivirus action, wherein the antivirus action removes the contaminated digital file.

19. The computer system of claim 17, the stored program instructions further comprising:
 program instructions to notify the given group of devices that the digital file has been contaminated; and
 program instructions to instruct the given group of devices to prohibit further transferring of the contaminated digital file within the given group of devices.

20. The computer system of claim 17, the stored program instructions further comprising:
 program instructions to retrieve, from the stored record: (i) a first UID for a transfer of the digital file to a second source device, and (ii) a second UID for a transfer of the digital file from the second source device; and
 program instructions to determine that the second source device is a potential source of the contamination based, at least in part, on the second UID being different from the first UID.

* * * * *